United States Patent [19]

Jamieson

[11] Patent Number: 5,052,516
[45] Date of Patent: Oct. 1, 1991

[54] DEER STANDS

[76] Inventor: Thomas C. Jamieson, Rte. 5, Box 2110, Phenix, Ala. 36867

[21] Appl. No.: 165,505

[22] Filed: Mar. 8, 1988

[51] Int. Cl.⁵ .................. A01M 31/02; A45F 3/26
[52] U.S. Cl. .................. 182/135; 182/187; 108/152
[58] Field of Search ............ 182/187, 188, 134, 135; 108/152

[56] References Cited

U.S. PATENT DOCUMENTS

| | | | |
|---|---|---|---|
| 656,626 | 8/1900 | Campbell | 182/57 |
| 3,856,111 | 12/1974 | Baker | 182/187 |
| 3,944,022 | 3/1976 | Ming | 182/187 |
| 4,230,203 | 10/1980 | Sweat | 182/134 |
| 4,316,526 | 2/1982 | Amacker | 182/135 |
| 4,417,645 | 11/1983 | Untz | 182/135 |
| 4,452,338 | 6/1984 | Untz | 182/187 |
| 4,488,620 | 12/1984 | Gibson | 182/135 |
| 4,726,447 | 2/1988 | Gibson | 182/187 |

Primary Examiner—Reinaldo P. Machado
Attorney, Agent, or Firm—Fleit, Jacobson, Cohn, Price, Holman & Stern

[57] ABSTRACT

Deer stands including a chair assembly having a seat and seat back and a footrest or stool both of which are vertically movably and securely supported on a tree trunk with the components being foldable to compact condition for ease of transporting to and from a site of use. The chair assembly is constructed with a seat and seat back provided with seat belt webbing material therein for safely supporting an occupant in a comfortable and relaxing position. In one form of the chair assembly, a generally V-shaped blade engages a tree trunk vertically above an abutment blade with the V-shaped blade being supported by a generally U-shaped frame member oriented above and in inclined relation to the seat portion of the chair assembly. In another form of the invention, the V-shaped blade is supported by a frame structure attached directly to the frame of the seat portion of the chair assembly.

2 Claims, 3 Drawing Sheets

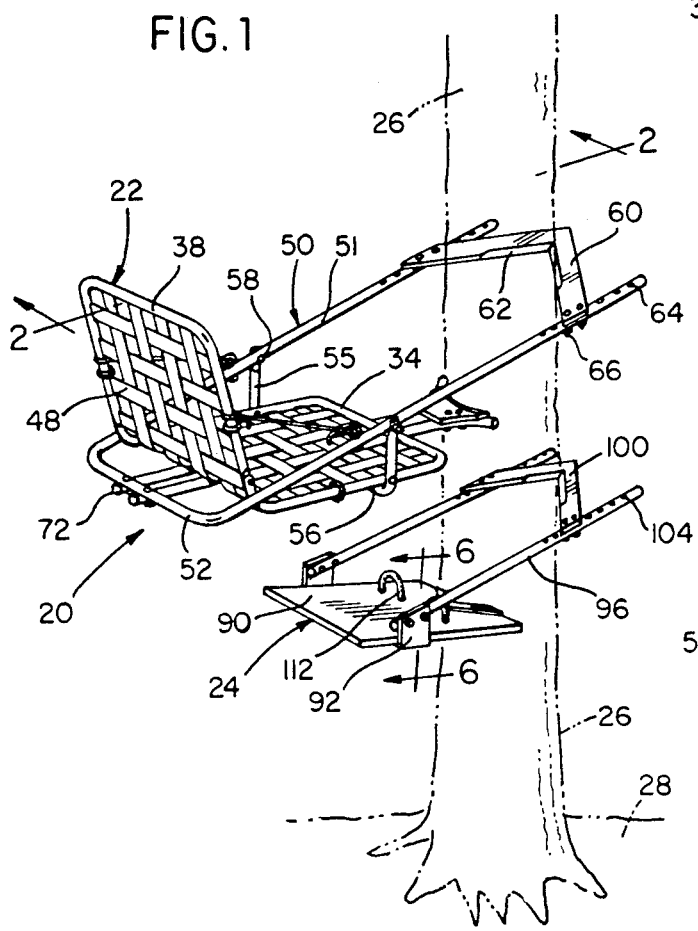
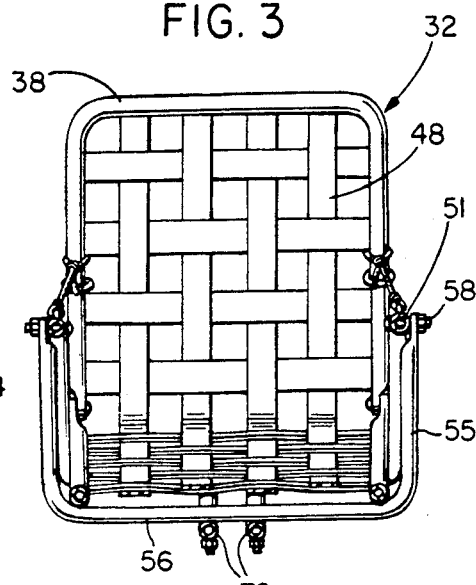
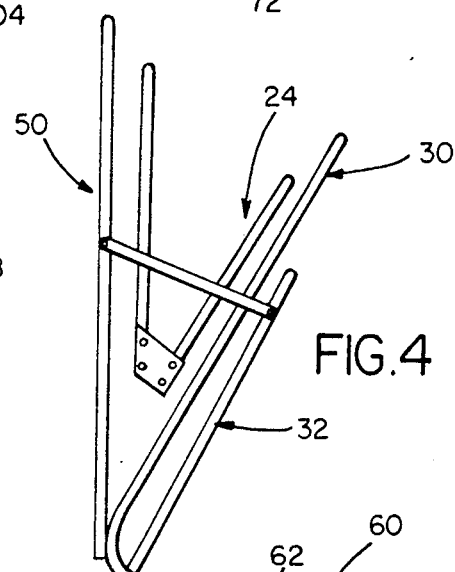
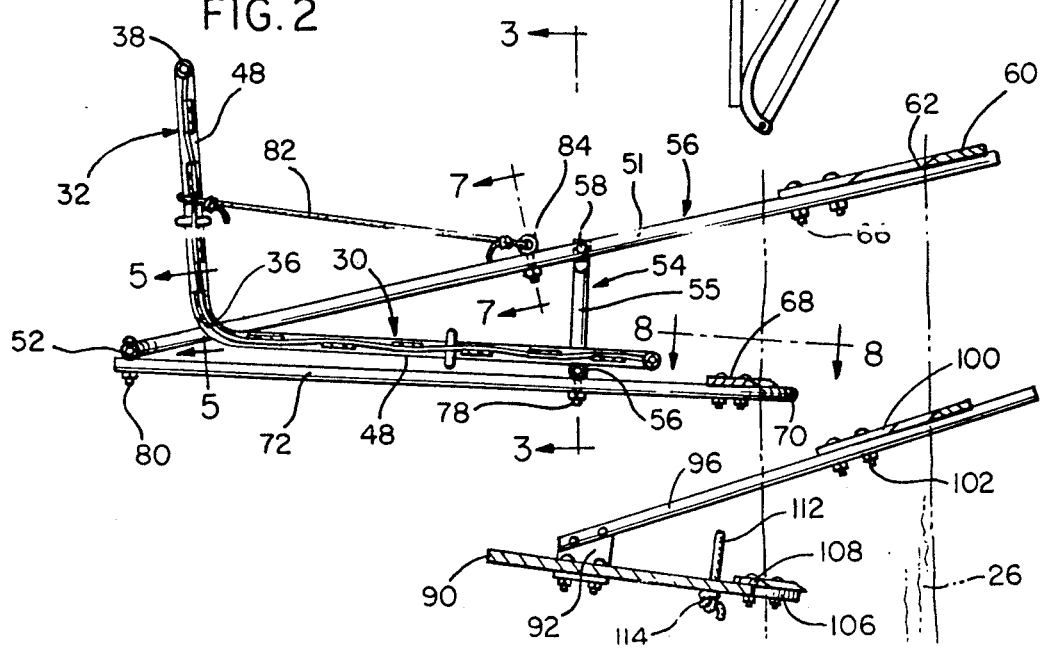

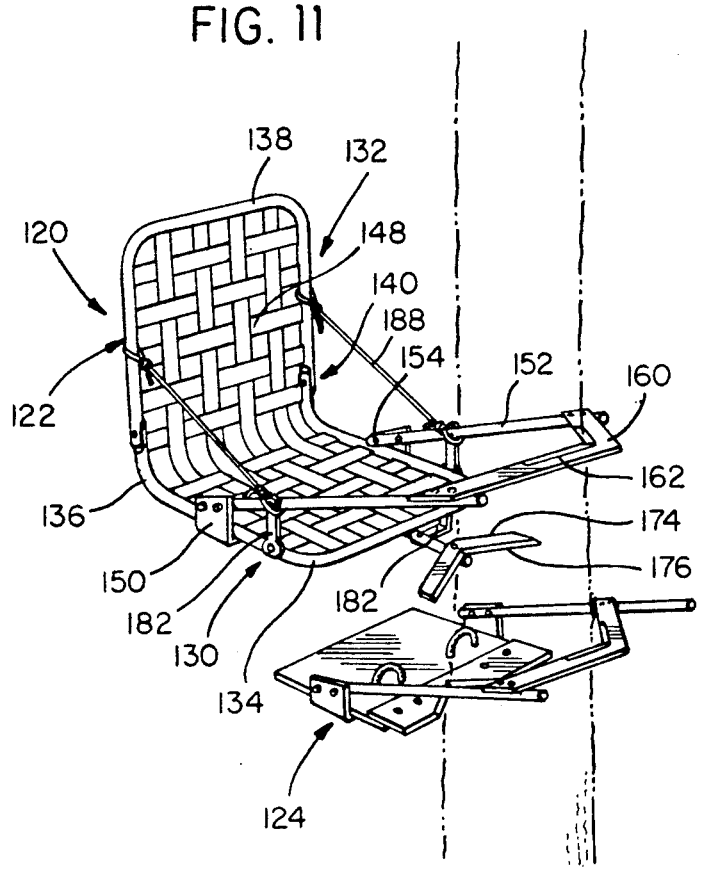
FIG. 11
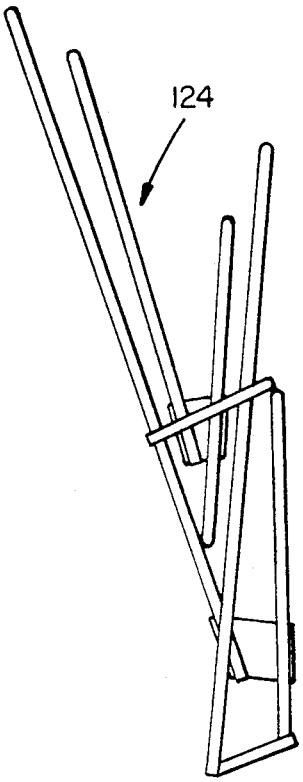
FIG. 12
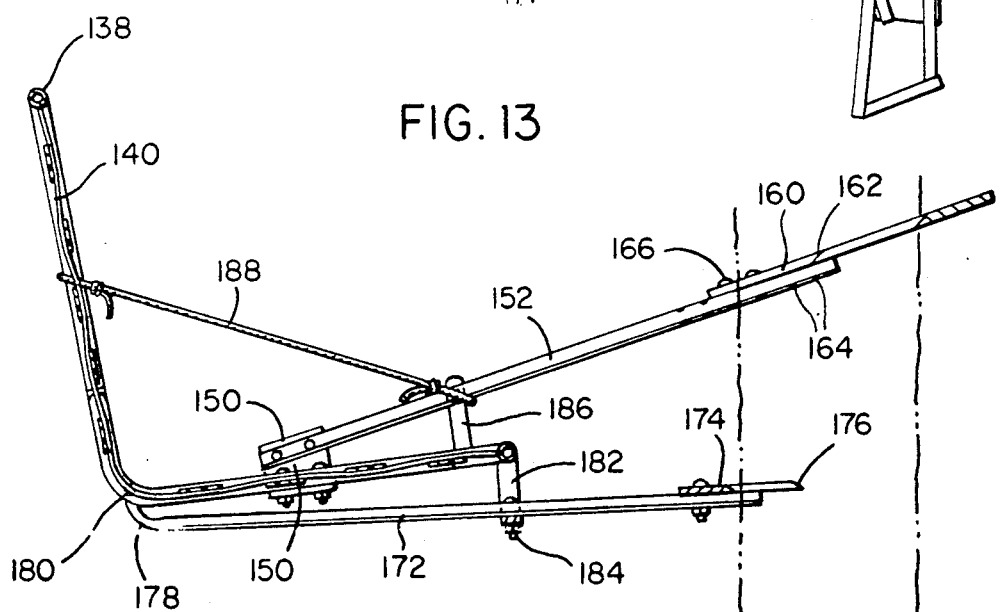
FIG. 13
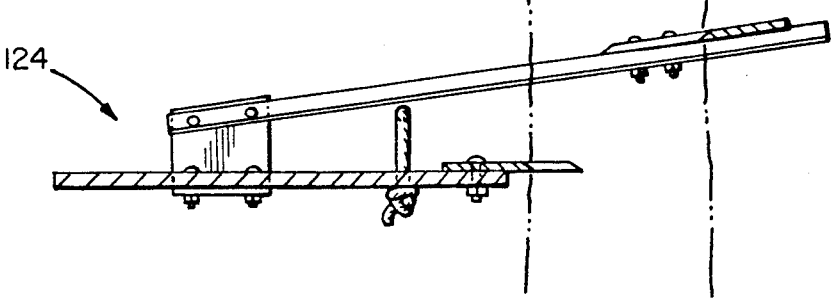

DEER STANDS

BACKGROUND OF THE INVENTION

1. Field of the Invention

The present invention generally relates to deer stands and more specifically deer stands including a chair assembly having a seat and seat back and a footrest or stool both of which are vertically movably and securely supported on a tree trunk with the components being foldable to compact condition for ease of transporting to and from a site of use. The chair assembly is constructed with a seat and seat back provided with seat belt webbing material therein for safely supporting an occupant in a comfortable and relaxing position. In one form of the chair assembly, a generally V-shaped blade engages a tree trunk vertically above an abutment blade with the V-shaped blade being supported by a generally U-shaped frame member oriented above and in inclined relation to the seat portion of the chair assembly. In another form of the invention, the V-shaped blade is supported by a frame structure attached directly to the frame of the seat portion of the chair assembly.

INFORMATION DISCLOSURE STATEMENT

Deer stands of various types have been provided so that hunters can support themselves in elevated relation on a tree trunk or the like. However, the prior patents known to applicant do not disclose a structure equivalent to the deer stands of this invention. The following U.S. Pat. Nos. are known to applicant:

3,856,111 3,944,022 4,230,203 4,316,526 4,452,338 4,488,620

SUMMARY OF THE INVENTION

An object of the present invention is to provide deer stands which can be easily transported to and from a site of use, easily assembled onto a tree trunk, easily moved vertically on the tree trunk by an occupant and safely and comfortably support a hunter in relaxed condition for long periods of time.

Another object of the invention is to provide deer stands including a chair assembly having a seat and seat back which are pivotally related for folding into a compact condition together with a footrest or stool which can also be folded into compact condition with both the chair assembly and foot rest including a generally V-shaped inwardly facing blade to engage a tree trunk on the far side in relation to the footrest and chair assembly and an abutment blade located below and in opposed relation to the V-shaped blade for engaging a tree trunk on the same side of the tree trunk as the chair assembly and footrest at an elevation below the V-shaped blade.

A further object of the invention is to provide deer stands in accordance with the preceding objects in which the chair assembly includes webbing in the seat and seat back constructed of seat belt material providing a safe but yet comfortable chair assembly for safely supporting hunters of different weights.

Still another object of the invention is to provide deer stands which are relatively lightweight in construction but yet of sturdy and long-lasting construction capable of safely supporting a hunter and capable of being easily moved vertically along the tree trunk in a step-by-step manner thereby eliminating the necessity of providing a separate ladder structure to position the deer stand in elevated position and to provide access to and from the deer stand.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of one form of the deer stand of the present invention.

FIG. 2 is a vertical sectional view taken substantially upon a plane passing along section line 2—2 on FIG. 1 illustrating the structural details of the deer stand.

FIG. 3 is a vertical sectional view of the chair assembly taken substantially upon a plane passing along section line 3—3 on FIG. 2.

FIG. 4 is a side elevational view illustrating the deer stand of FIG. 1 in folded and nested condition.

FIG. 11 is a perspective view of another embodiment of the deer stand.

FIG. 12 is a vertical sectional view of the deer stand of FIG. 11.

FIG. 13 is a side elevational view of the deer stand of FIG. 11 illustrated in folded position.

DESCRIPTION OF THE PREFERRED EMBODIMENTS

Figure 5:
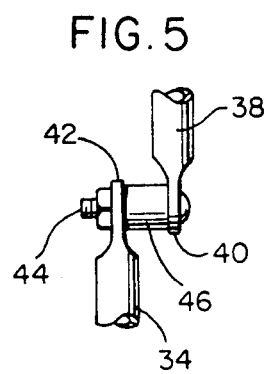
FIG. 5 is a detailed sectional view of the hinged connection between the seat back and seat taken along section line 5—5 on FIG. 2.

Referring now specifically to FIGS. 1-9, the deer stand illustrated therein is generally designated by reference numeral 20 and includes a chair assembly generally designated by reference numeral 22 and a footrest or stool assembly generally designated by reference numeral 24 with these two components being supported securely and in vertically adjustable position on a tree trunk 26 in elevated relation to the ground surface 28.

The chair assembly 22 includes a chair seat 30 and a seat back 32 which are pivotally connected in a manner defined hereinafter. The chair seat 30 includes a U-shaped frame 34 of tubular metal construction with the legs of the U-shaped frame 34 being upturned as at 36. The seat back 32 includes a similar U-shaped frame 38 which extends upwardly from the terminal ends of the upturned ends 36 of the legs of the frame 34. As illustrated in FIG. 5, the lower ends of the legs of the U-shaped frame 38 are flattened as at 40 and the upper terminal end of the upturned ends 36 of the frame 34 are also flattened as at 42 for receiving a pivot bolt 44 therethrough with a spacer 46 being provided between the flattened ends 40 and 42 as illustrated in FIG. 5 to enable assembly of the frames 34 and 38 with these frames being pivotal from the position illustrated in FIGS. 1 and 2 to a collapsed position as illustrated in FIG. 4.

Both the seat 30 and the seat back 32 include webbing 48 forming a seat and backrest with the webbing being secured to the frames 34 and 38 in a conventional manner with the webbing being crossed and interrelated in a conventional manner. The webbing 48 is constructed of seat belt straps which are substantially stronger than webbing used in lawn chairs and the like in order to provide a safe support for hunters of different weights.

An inclined U-shaped frame 50 has the legs 51 thereof extending in an upwardly and outwardly inclined relation to the frame 34 and a bight portion 52 oriented in spaced relation to the juncture between the seat 30 and seat back 32 as illustrated in FIG. 2. The inclined frame 50 is secured to the upper ends of a U-shaped frame 54 that has a bight portion 56 underlying and secured to the frame 34 as illustrated in FIG. 1 with the upper ends of the legs 55 of the frame 54 being secured to the frame 50 by fasteners at 58. The outer end of the frame 50 includes an inwardly facing V-shaped blade 60 adjustably supported therefrom with the blade 60 having a sharpened or beveled edge 62 facing inwardly toward the tree trunk 26 as illustrated in FIG. 1 with the blade 60 being disposed on the far side of the tree trunk 26 as compared to the chair assembly 22. The legs 51 of the frame 50 include a plurality of openings 64 receiving fasteners 66 extending through the ends of the blade 60 and the aperture 64 to enable the blade 60 to be adjusted longitudinally of the legs of the frame 50.

Figure 8:
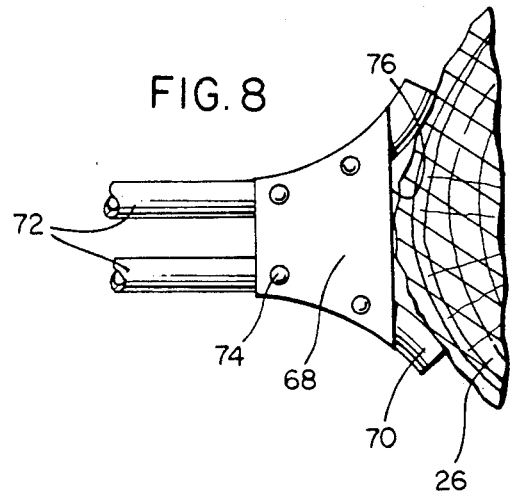
FIG. 8 is a fragmental plan view of the abutment blade taken substantially along reference line 8—8 on FIG. 2.

Located below the frame 34 and below the blade 60 is an abutment blade 68 that is supported from outturned ends 70 of a pair of longitudinally extending bars 72 with fastening devices 74 securing the plate-like blade 68 to the outwardly curved ends 70 in spaced relation to the ends 70 which diverge from each other for guiding engagement with the tree trunk so that the blade edge 76 which may be beveled or sharpened will be guided into engagement with the tree trunk 26 as illustrated in FIG. 8. The bars 72 are relatively closely spaced and are in the form of metal tubes and extend under the bight portion of the U-shaped member 54 and are secured thereto by fasteners 78 with the bars 72 extending under and rearwardly of the seat 30 with the ends thereof being secured to the bight portion 52 of the frame 50 by fasteners 80 so that the frame 50 and the bars 72 are retained in angular and rigid relation by the fasteners 80 and the legs of the frame 54 which have their upper ends rigidly secured to the frame 50 and the bight portion rigidly affixed to the bars 72 as illustrated in FIG. 2. Also, the bars 72 are centrally located with respect to the seat 30 in frame 34 so that an occupant of the chair assembly can place his legs and feet in straddling relation to the bars 72 with the knee portions of the occupant being located between the frame 34 and the tree trunk 26 so that the occupant can comfortably sit in the chair assembly 22.

The seat back 32 is retained in upright position by a pair of brace cords 82 extending from an eye bolt 84 on the legs 51 of the frame 50 through an attachment point 86 on the legs of the frame 38 which may be an aperture so that the rearward pivotal movement of the seat back is limited but yet the seat can pivot forwardly as each cord 82 is a flexible tension member.

With this construction, the frame 50, bars 72, U-shaped frame 54 and the blades 60 and 68 are all rigid with respect to each other with the chair assembly 22 being vertically movable on the tree trunk 26 by tilting it so that the blades 60 and 68 are disengaged from the tree trunk 26 to enable the chair assembly to move upwardly or downwardly along the tree trunk. The chair seat 30 and seat back 32 provide a comfortable support for the occupant and the seat back 32 can be folded downwardly toward the seat 30 as the flexible cords 82 permit forward folding of the seat back 32 but limit its rearward tilting movement to a desired adjustable angular position most comfortable to the occupant.

Figure 6:
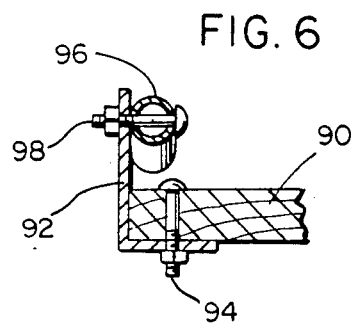
FIG. 6 is a detailed sectional view of the connection between the footrest and blade supporting frame member taken along section line 6—6 on FIG. 1.
Figure 7:
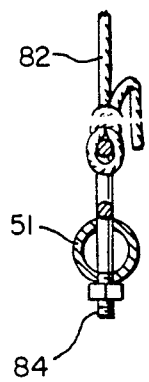
FIG. 7 is a detailed sectional view of the connection between the brace cord and main bar supporting the V-shaped blade taken substantially along section line 7—7 on FIG. 2.

The footrest or stool 24 includes a generally rectangular rigid panel 90 having an L-shaped bracket 92 secured to each side edge thereof by fastening bolts 94 or the like as illustrated in FIG. 6. The upper edge of the bracket 92 is inclined and has a pair of support bars 96 secured thereto by fasteners 98. The support bars 96 are in the form of tubular members and extend in upwardly diverging relation to the panel 90 as illustrated in FIG. 2. The outer ends of the bars 96 are interconnected by a V-shaped blade 100 generally similar to the blade 60 with the V-shaped blade 100 being secured to the bars 96 by fasteners 102 extending through selected apertures 104 in the bars 96 for adjustment purposes. The edge of the panel 90 remote from the brackets 92 is provided with a V-shaped notch 106 and blades 108 are mounted on the edges of the V-shaped notch and the blades may be beveled as indicated by numeral 110 with the blades being secured to the panel 90 by fasteners 111. The blades 108 and blade 100 function in the same manner as the blades 60 and 68 on the chair assembly since they are rigid with respect to each other and laterally spaced with respect to each other and vertically spaced in relation to each other so that when the blade 100 is engaged with the far side of the tree trunk and the blades 108 are engaged with the near side of the tree trunk and pressure is applied downwardly on the panel 90, the footrest will be securely and safely locked to the tree trunk. Yet, the footrest can be moved vertically up or down the tree trunk by tilting it so that the blades 100 and 108 will be disengaged from the tree trunk. The panel 90 is provided with a pair of loop-shaped stirrups 112 in the form of cords or rope sections extending through apertures in the panel 90 and provided with terminal knots 114. The stirrups 112 receive the toe portions of the shoes of an occupant of the chair assembly 22 so that the occupant of the chair assembly 22 can lift the footrest upwardly by inserting his toes into the stirrups 112 and lifting which enables pivotal movement of the footrest 24 so that it can be moved upwardly on the tree trunk or when descending, the reverse procedure can be followed by which the occupant of the chair assembly can lift the panel 90 and tilt the footrest so that it can be moved to a lowered position so that the occupant of the chair assembly can move not only the footrest but also the chair assembly in a step-by-step manner up or down the tree trunk.

Figure 10:
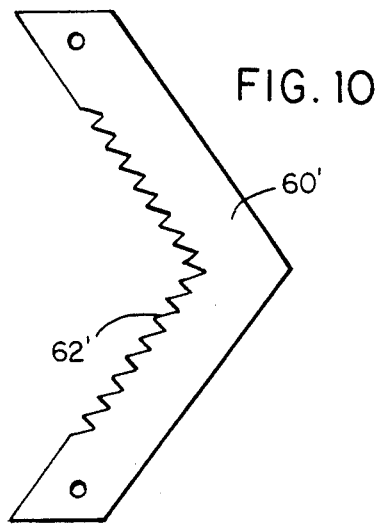
FIG. 10 is a plan view of a serrated V-shaped blade.
Figure 9:
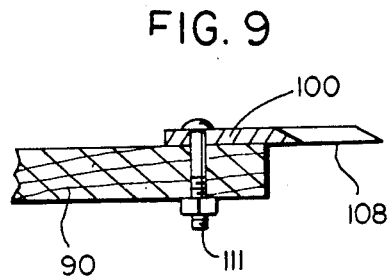
FIG. 9 is a fragmental sectional view of the abutment blade on the footrest.

FIG. 10 illustrates a modified blade structure 60' which includes a serrated edge 62' which may include saw teeth rather than the smooth bevelled edge 62. Either embodiment of the blade may be used and similar blade edge structures may be utilized on the other blade associated with the chair assembly or the blades associated with the footrest 24.

Referring now specifically to FIGS. 11-13, another embodiment of the deer stand is generally designated by reference numeral 120 and includes a chair assembly 122 and a footrest or stool 124 which is substantially identical to the footrest assembly 24 in FIGS. 1-10.

The chair assembly 122 includes a seat 130 and a seat back 132 with the seat 130 including a U-shaped frame 134 with upturned ends 136 and the seat back includes a frame 138 pivotally connected to the seat at pivot assembly 140. Webbing 148 is provided on the frames 134 and 138. In this construction, the frame 134 includes a pair of upstanding brackets 150 rigidly affixed thereto with each of the brackets including a tubular bar 152 extending upwardly and outwardly therefrom with the bars 152 being secured to the brackets 150 by fastening devices 154. The outer ends of the bars 152 are interconnected by a V-shaped blade 160 having a bevelled or sharpened inner edge 162 with the blade being secured to the bars in an adjustable manner by fasteners 166 through a plurality of spaced apertures 164 so that the blade 160 can be adjusted longitudinally of the bars 152.

Underlying the seat 130 is a centrally disposed bar 172 having a V-shaped abutment blade 174 on the outer end thereof which includes an outwardly facing V-shaped bevelled edge 176. The central bar 172 has an upturned rearward end 178 secured to a transverse bar 180 extending between the legs of the U-shaped frame 134 at the junction between the horizontal portion and the upturned portion 136 with the central bar being rigidly affixed thereto by suitable fasteners and the like. A brace member 182 extends downwardly from the center of the forward bight portion of the frame 134 and is rigidly affixed to the bar 172 by a fastening device 184 thus providing a rigid connection between the chair seat 130 and the bar 172 and the blade 174. The bars 152 are also rigidly supported from the frame 134 by braces 186 which are rigidly secured to the frame 134 and the bars 152 in spaced relation to the brackets 150. A cord brace 188 extends between the upper end of the braces 186 and the frame 138 above the pivot connection 140 to limit the rearward pivoting movement of the chair back 132 but yet permitting the chair back to fold forwardly toward the chair seat 130.

As illustrated in FIGS. 4 and 13, the chair assembly can be folded with the seat back 32 or 132 pivoted forwardly and downwardly to a position adjacent the chair seat 30 or 130 with the frame 50 or bars 152 diverging from the downwardly folded seat back 32 or 132 which provides a generally V-shaped space to receive the footrest 24 or 124 as illustrated in FIGS. 4 and 13, respectively. This enables the deer stand to be easily carried to and from the site of use since the uppermost blade may be used as a carrying handle or engaged over the shoulder with appropriate protection with the remainder of the deer stand suspended alongside of the leg of the person carrying it. The deer stand may be easily assembled with respect to the tree trunk by temporarily disconnecting the uppermost blade on the chair assembly and footrest with adjustment of the blades enabling effective use with tree trunks of varying sizes. The footrest is initially placed near the ground surface with the chair assembly above the footrest in a position so that the occupant can easily step onto the footrest panel and into the chair assembly and assume a seated position on the seat section with his feet engaging the footrest. The occupant may then move the deer stand and himself up the tree trunk by standing on the footrest and elevating the chair assembly by tilting it and moving it upwardly after which the occupant will release the chair assembly and as soon as it is secure by engagement of the upper blade and abutment on the chair assembly with the tree trunk. The occupant may then be seated in the chair assembly and engage his feet with the stirrups 112 and move the footrest upwardly along the tree trunk to a position more closely underlying the chair assembly and by repeating this procedure, the chair assembly, footrest and hunter or occupant may move upwardly on the tree trunk in a step-by-step manner and in the reverse procedure the chain assembly, footrest and hunter or occupant may move downwardly along the tree trunk in a step-by-step manner. The nylon seat belt webbing provides a safe and secure chair assembly capable of supporting hunters or occupants having various physical size characteristics. If desired, plywood or other rigid panels may be used in the seat and seat back to form more rigid structures.

As indicated, the footrest or foot stool 24 and 124 are preferably of identical construction with the panel 90 being plywood of rectangular configuration with two pieces of rope forming the foot stirrups to receive the toe portions of the feet of the hunter or occupant. The blade formed in the V-shaped notch in the outer edge of the panel may be in the form of two flat plates fastened to the side edges of the V-shaped notch in the panel. The upper blade on the chair assemblies may be either the bevelled smooth edge or sharpened edge or the serrated or toothed edge as illustrated and the various components may be secured together by conventional fasteners and, in some instances, the frame and support components may be of welded construction. The embodiment illustrated in FIGS. 11-13 can be easily constructed with the frame components welded in place but in both embodiments of the chair assembly, the upper blade which engages the far side of the tree must be removable and longitudinally adjustable. Likewise, the blade on the footrest which engages the far side of the tree must also be removable and longitudinally adjustable. Also, a cord should interconnect the footrest and chair assembly to prevent excessive separation of these components thereby eliminating the possibility that the footrest could fall downwardly on the tree trunk due to the feet of the hunter or occupant tilting the footrest into inclined position and then releasing the footrest by the feet becoming disengaged from the stirrups. Inasmuch as a hunter frequently will occupy a deer stand for long periods of time, it is essential that the hunter be comfortable and securely supported. The deer stands disclosed enable the hunter to relax in a comfortable position and yet enable necessary functions to be accomplished without the risk of being injured due to falling and the like. The hunter can safely support himself in elevated position and still have total control of a gun or guns, bow and arrow and the like and have complete freedom of movement to manipulate whatever weapons and other accessory items that he may have with him, such as a supply of drinking water, food and the like.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A deer stand for supporting a hunter in elevated position on a tree trunk comprising a chair assembly and a footrest located below a chair assembly, said chair assembly including a seat having an outwardly and upwardly inclined support assembly extending therefrom and supporting a transversely extending blade for engaging the far side of a tree trunk and an abutment extending centrally from the seat engaging the tree trunk in a position opposed to the blade and positioned below the blade for supporting the seat from the tree trunk in a manner to enable vertical movement of the chair assembly when the seat is provided to disengage the blade and abutment form the tree trunk, said footrest comprising a panel for supportingly engaging the feet of a hunter occupying the chair assembly, an upwardly and outwardly inclined support assembly including a transverse blade engaging the far side of a tree trunk and an abutment extending from the panel for engaging the tree trunk on the opposite from the blade and at a position below the blade on the footrest in a manner that the footrest can be moved vertically on the tree trunk when oriented in inclined relation to disengage the blade and abutment from the tree trunk, said chair assembly also including a seat back, means pivotally supporting the seat back from the seat and including means to limit the rearward pivotal movement of the seat back to an upwardly inclined position and enabling pivoting movement of the seat back to a position alongside of the seat to enable the device to be collapsed into compact condition for easy transport to and from a site of use, said support assembly for the seat including a pair of support bars extending outwardly and upwardly from opposite sides of the chair assembly with the outer ends of the bars being interconnected by said blade, said blade including an inwardly facing V-shaped edge engaging the far side of the tree trunk and fastener means longitudinally adjustably securing the blade to the bars and enabling the blade to be separated from the bars to enable the chair assembly to be assembled onto a tree trunk with the adjustment of the blade enabling the chair assembly to be supported on tree trunks of different sizes, fastener means adjustably securing said blade on the footrest to the support assembly on the footrest to enable the footrest to be assembled with respect to tree trunks of different sizes, said abutment on the footrest including a V-shaped notch in the edge of the panel facing the tree trunk in opposed relation to the footrest blade, and a blade mounted on the panel along each edge of the V-shaped notch, and foot engaging stirrup means on the footrest panel receiving the toe portions of the feet of a hunter to enable the hunter to tilt and change the elevation of the footrest in relation to the chair assembly to enable the hunter to move the footrest and chair assembly vertically up and down the tree trunk in a step-by-step manner, said abutment on the chair assembly including an elongated support member extending under the chair seat and being rigidly connected to the chair seat in rigid relation to the support bars for the transverse blade, said abutment including a pair of parallel members having outwardly curved forward ends, an abutment plate interconnecting the outwardly curved forward ends in spaced relation to the terminal ends thereof whereby the outwardly curved ends will engage a tree trunk and guide the abutment plate into engagement with the trunk.

2. The deer stand as defined in claim 1 wherein said pair of parallel members extend beyond the seat, said pair of bars interconnected by the transverse blade extending beyond the chair seat and being rigidly connected thereto to provide a rigid triangular configuration supporting the transverse blade and abutment plate in vertically and laterally spaced relation on opposite sides of a tree trunk.

* * * * *